United States Patent [19]

Svedaker

[11] Patent Number: 4,828,125
[45] Date of Patent: May 9, 1989

[54] DEVICE FOR MAINTAINING A TOOL ATTACHMENT IN A KNUCKLE BOOM CRANE ON A CONSTANT LEVEL ABOVE THE GROUND

[75] Inventor: Olle Svedaker, Alfta, Sweden
[73] Assignee: Osa AB, Sweden
[21] Appl. No.: 190,688
[22] PCT Filed: Aug. 27, 1987
[86] PCT No.: PCT/SE87/00377
  § 371 Date: Apr. 21, 1988
  § 102(e) Date: Apr. 21, 1988
[87] PCT Pub. No.: WO88/01600
  PCT Pub. Date: Mar. 10, 1988

[30] Foreign Application Priority Data
Sep. 1, 1986 [SE] Sweden ............................ 8603660

[51] Int. Cl.⁴ .................................................. B66C 23/54
[52] U.S. Cl. ........................................ 212/256; 212/261
[58] Field of Search ................ 212/153, 223, 232, 237, 212/238, 255, 256, 260, 261

[56] References Cited

U.S. PATENT DOCUMENTS

| | | | |
|---|---|---|---|
| 3,685,668 | 8/1972 | Suverkrop | 212/256 |
| 3,815,759 | 6/1974 | Gallay | 212/256 |
| 3,884,359 | 5/1975 | Suverkrop | 212/256 |
| 4,081,055 | 3/1978 | Johnson | 212/256 |
| 4,557,391 | 12/1985 | Poock et al. | 212/256 |

FOREIGN PATENT DOCUMENTS

| | | |
|---|---|---|
| 2439967 | 1/1976 | Fed. Rep. of Germany . |
| 2802011 | 8/1979 | Fed. Rep. of Germany . |
| 2949718 | 6/1981 | Fed. Rep. of Germany . |
| 400794 | 4/1978 | Sweden . |

Primary Examiner—Sherman D. Basinger
Assistant Examiner—Stephen P. Avila
Attorney, Agent, or Firm—McFadden, Fincham, Marcus & Allen

[57] ABSTRACT

The invention relates to a device for maintaining a tool attachment in a knuckle boom crane, preferably for forest machines, on a constant level above the ground. The knuckle boom comprises a main boom which can be raised and lowered by means of a double-acting hydraulic cylinder (4), and an outer boom pivotal relative to the main boom my means of a likewise double-acting hydraulic cylinder (6). To ensure the vertical adjustment of the tool attachment, the lift cylinder (4) is connectible to the outer boom cylinder (6) via a compensator (21) in such a manner that an amount of hydraulic fluid which is proportional to the amount of hydraulic fluid which upon activation of the outer boom is pressed out from the lifting or the lowering side, respectively, of one of the cylinders (4, 6), is pressed into the lowering or the lifting side, respectively, of the other cylinder. The compensator comprises at least one hydraulic cylinder (22) having two chamber (23, 26) which are separated by a piston (31) movable in the cylinder and having two different working areas or displacements (24, 25) in the two chambers (23, 26). The lift cylidner (4) is connectible to one chamber (26) and the outer boom cylinder to the other chamber (23).

6 Claims, 2 Drawing Sheets

DEVICE FOR MAINTAINING A TOOL ATTACHMENT IN A KNUCKLE BOOM CRANE ON A CONSTANT LEVEL ABOVE THE GROUND

TECHNICAL FIELD OF THE INVENTION

This invention relates to a device for maintaining a tool attachment in a knuckle boom crane, preferably for forest machines, on a constant level above the ground, the crane comprising a main boom which can be raised and lowered by means of a first double-acting hydraulic cylinder, and an outer boom pivotal relative to the main arm by means of a second double-acting hydraulic cylinder.

BACKGROUND OF THE INVENTION

Knuckle boom cranes have been extensively used because of their capability of reaching any desired point within the volume the tool attachment or the load application point describes. This is achieved by separate operation of the crane post, main boom, outer boom and telescopic part of the outer boom. Even in normal use, concurrent operation of all these functions requires an experienced, clear-thinking operator.

It has proved desirable to employ vehicle-borne knuckle boom cranes of the above-mentioned type also in mechanized tree felling and primarily in shrub cleaning, the felling or cleaning tool being attached at the load application point of the outer boom, since special machines cannot be used for economic reasons. Shrub cleaning means that a hydraulically driven flail is swung back and forth at a constant vertical level, both perpendicularly out from and along the direction of travel of the tractor. The vertical position of the flail above the ground should be approximately constant. This is achieved by constant changes of the mutual angular positions of the main boom and the outer boom, often in combination with telescopic extension of the outer boom. The cleaning operation must be effected rapidly since large areas are to be covered, and the suitable cleaning period is short. This means that the driver must run the vehicle and operate the outer boom while ascertaining that valuable plants and trees are spared and that the flail gets clear of stones and of the ground. This has proved troublesome with outer booms of the standard type. To facilitate this work, it is desirable to have a linear horizontal tool path which can be controlled by the driver with a single control instead of three. Such a path is obtained if the oil flows to the hydraulic cylinders of the main boom and the outer boom are positively controlled in such a manner that if the tip of the main boom moves upwards a predetermined vertical distance, the tool attachment of the outer boom is lowered the same distance. The tool thus remains on the same vertical level while simultaneously moving inwards towards the vehicle. Such a function is in principle achieved if the hydraulic fluid conduits of the outer boom are so connected that the oil which is pressed out from the lift cylinder when the main boom is raised, instead of returning to the oil tank, is conducted to the lowering side of the outer boom cylinder. However, this presupposes that the geometry and the cylinder dimensions agree with each other under certain given conditions. These are however determined primarily by the basic tasks to be performed by the outer boom, such as lifting timber. Only theoretical conditions would make it possible to use the outer boom both for timber transport and for shrub cleaning solely by switching the hydraulic fluid conduits.

BRIEF ACCOUNT OF THE INVENTIVE CONCEPT

The present invention aims at providing a device which permits using standard-type knuckle boom cranes which are not primarily intended for shrub cleaning, also usable for this purpose. According to the invention, this is achieved in that said first cylinder or lift cylinder, when desired, is connectible via at least one compensator to the second cylinder or outer boom cylinder in such a manner that an amount of hydraulic fluid which is proportional to the amount of fluid which upon activation of the outer boom is pressed out from the lifting or the lowering side, respectively, of one of said cylinders, is pressed into the lowering or the lifting side, respectively, of the other of said cylinders, said compensator comprising at least one hydraulic cylinder having two pressure chambers separated by a movable piston having two different working areas or displacements in said two chambers, and that the lift cylinder is connectible to one chamber and the outer boom cylinder is connectible to the other chamber, the working areas of said piston being so selected that the resulting hydraulic fluid flow between the lift cylinder and the outer boom cylinder positively ensures the desired vertical adjustment of the outermost point of the outer boom.

BRIEF DESCRIPTION OF THE ACCOMPANYING DRAWINGS

In the drawings,

FIG. 1 is a side view of a forest machine provided with a knuckle boom crane of the type concerned, FIG. 2 is a hydraulic flow diagram showing how the compensator is connected between the outer boom cylinder and the lift cylinder, and FIG. 3 is a side view on a larger scale illustrating how the load application point can move after the compensator has been connected.

DETAILED DESCRIPTION OF A PREFERRED EMBODIMENT OF THE INVENTION

Figure 1:
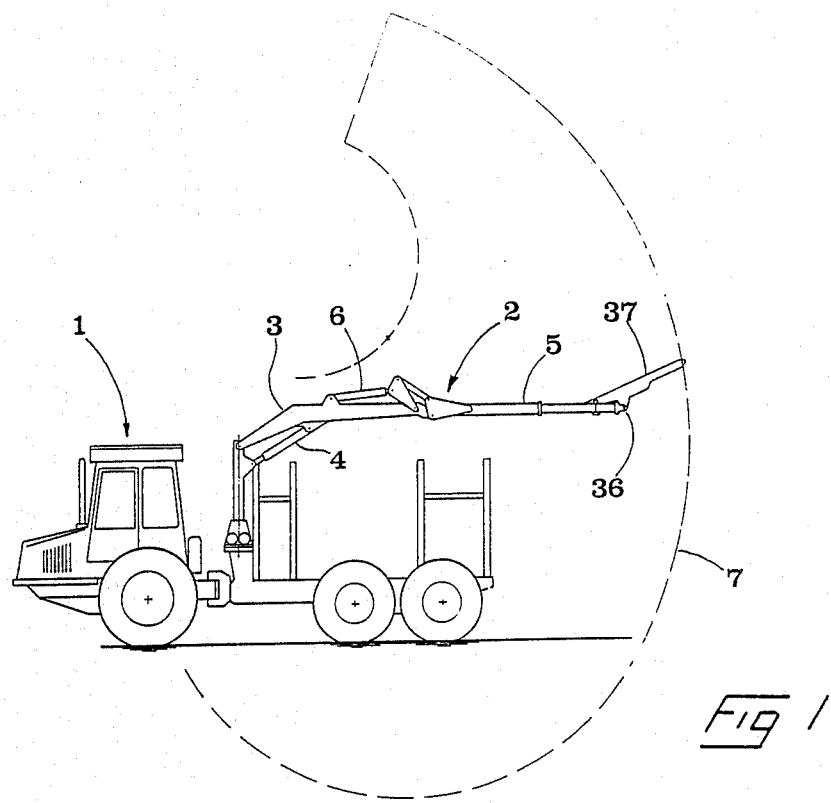

In FIG. 1, a forest machine in the form of a forwarder, generally designated 1, carries a crane 2 of the knuckle boom type. The crane 2 comprises a main boom 3 which can be raised and lowered by pivoting relative to a crane post by means of a first double-acting hydraulic cylinder 4, and an outer boom 5 which is pivotal relative to the main boom by means of a second double-acting hydraulic cylinder 6. The outer boom 5 can be telescopically extended by means of a double-acting hydraulic cylinder (not shown). The broken line 7 in FIG. 1 shows the total working range of the crane. The load application point 36 of the outer boom is provided with a tool attachment 37.

Figure 2:
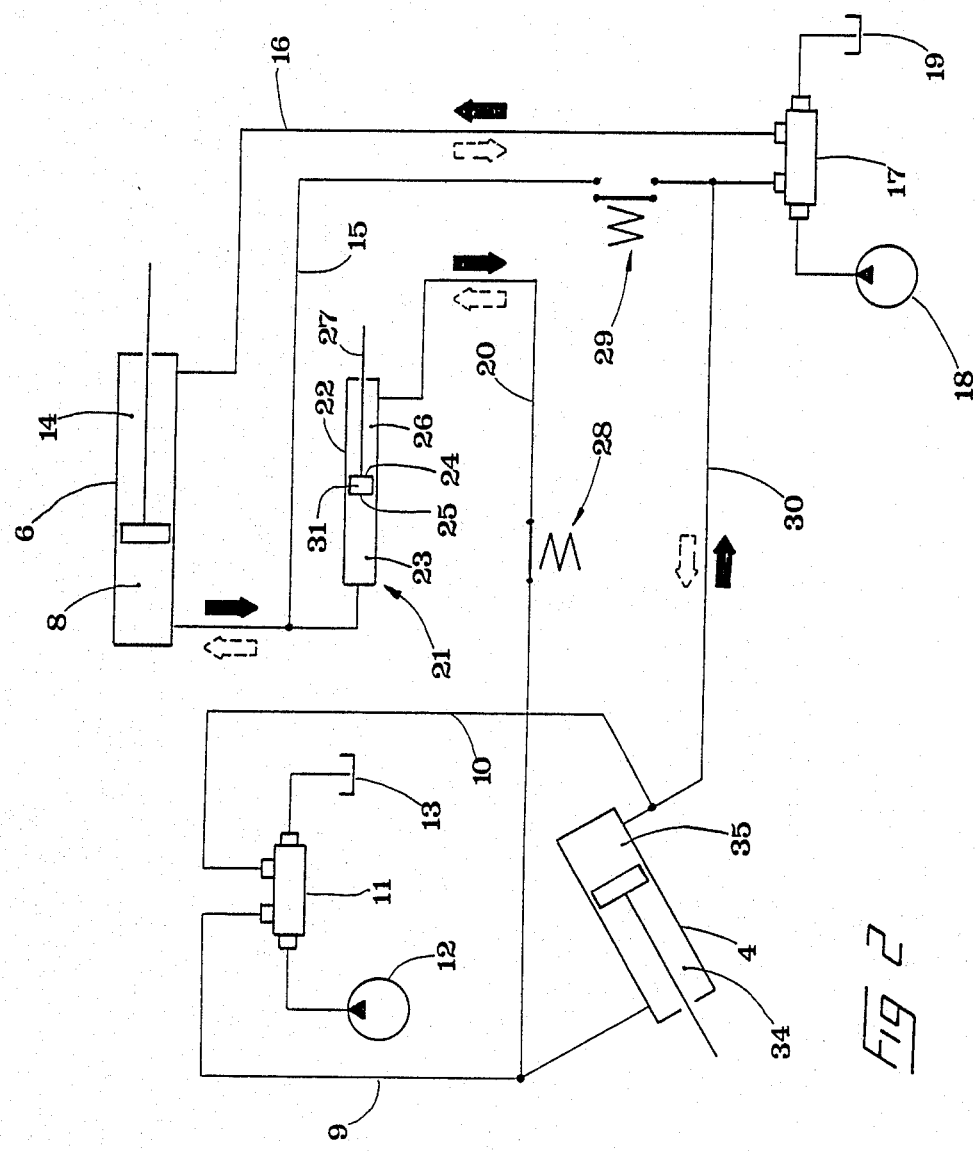

In FIG. 2, it is shown how the lift cylinder 4 for the main boom 3 is connected by conduits 9, 10 and a directional valve 11 to a hydraulic pump 12 and an oil tank 13. The outer boom cylinder 6 is connected by conduits 15, 16 and a directional valve 17 to a hydraulic pump 18 and an oil tank 19. In normal cases, the pumps 12 and 18 constitute a single pump, and the oil tanks 13 and 19 constitute a single oil tank. Also, the directional valves 11 and 17 may be devised as a single unit, but for greater clarity these valves are illustrated as parts of separate circuits. The lifting side 8 of the outer boom cylinder 6 is connected by a conduit 20, a compensator 21 and an electrically operated valve 28 to the lowering side 34 of the lift cylinder 4. The valve 28 cooperates with an electrically operated valve 29 connected in the conduit 15 in such a manner that when the valve 28 is closed, the valve 29 is maintained open, and vice versa. The directional valve 17 is connected by the conduit 15 and a conduit 30 to the lifting side 35 of the lift cylinder 4. In a preferred embodiment, the compensator consists of a conventional hydraulic cylinder 22 having a piston rod 27 and a piston 31 separating two different chambers 23 and 26. The cylinder 22 is of the double-acting type, and the piston 31 has two different working areas 25 and 24 because of the piston rod 27 arranged centrally on the working area 24. In the illustrated embodiment, the valve 28 is closed and the valve 29 is open, which means that the hydraulic system is connected for vertical positioning, here entirely controlled by an operating lever for the outer boom cylinder 6. The full arrows indicate the flow in the system when the load application point 36 of the outer boom 5 moves out from the vehicle while the broken arrows indicate the flow in the system when the same point moves inwards towards the vehicle Thus, when the load application point or the outer boom tip 36 should be maintained on the desired level and move out from the vehicle, the directional valve 17 is set in such a position that hydraulic fluid from the pump 18 is pressed to the lowering side 14 of the outer boom cylinder 6 via the conduit 16 as indicated by the full arrow. Hydraulic fluid is then pressed out from the lifting side 8 of the cylinder 6 and into the chamber 23 of the compensating cylinder 22. As a result, hydraulic fluid will be pressed out from the second chamber 26 of the compensator through the conduit 20 and the valve 28 and to the lowering side 34 of the lift cylinder 4. Hydraulic fluid is then pressed out from the lifting side 35 of the cylinder 4, through the conduit 30 and the directional valve 17 and to the tank 19. If the tip 36 should be moved inwards towards the vehicle, the directional valve 17 is switched such that the hydraulic pump 18 pumps hydraulic fluid into the lifting side 35 of the cylinder 4 through the conduit 30, which means that hydraulic fluid is pressed out from the lowering side 34 of the cylinder 4, through the conduit 20 and into the chamber 26 of the compensating cylinder 22, whereby an amount of liquid which depends upon the working areas in the cylinder, is pressed out from the other chamber 23 and into the lifting side 8 of the outer boom cylinder 6. Hydraulic fluid is pressed out from the lowering side 14 of the cylinder 6, through the conduit 16 and the directional valve 17 and to the tank 19. The two above-mentioned positions of the directional valve correspond to the lifting and the lowering position, respectively, of the valve during normal operation of the outer boom.

The connection of the conduit 20 between the lift cylinder 4 and the outer boom cylinder 6 means that the lift cylinder 4 will move in dependence upon the movements of the outer boom cylinder 6. Now, if the compensating cylinder 22 is a standard cylinder having suitable working areas 24, 25, the proportions between the hydraulic fluid flow entering the cylinder 22 and the hydraulic fluid flow leaving the cylinder will be such that upon actuation of either the lift cylinder or the outer boom cylinder by means of the directional valve 17, the load application point of the outer boom will move in one and the same horizontal plane. By means of the directional valve 11 and the conduits 9, 10, the lift cylinder can be temporarily actuated during said vertical positioning procedure in order to make the tool avoid such obstacles as stones or stumps. Further, this hydraulic circuit makes it possible to set the vertical position of the load application point. By means of a thus connected hydraulic system in a knuckle boom crane, it is thus possible to have the load application point of the outer boom move in a single plane by means of a single control means.

Figure 3:
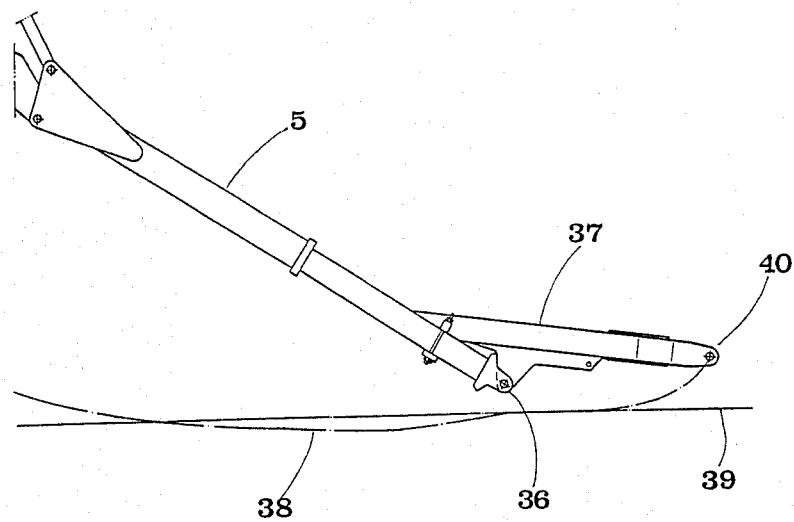

In FIG. 3, it is shown how the tip 40 of a tool attachment 37 mounted in the load application point 36 of the outer boom 5 can move (along the line 38) under the influence of a compensator in the form of a standard cylinder connected in the above-mentioned way. The line 39 here indicates a horizontal plane. In this context, it should be pointed out that the movement of the flail need not be exactly linear to ensure acceptable cleaning but, as shown in FIG. 3, may deviate from the ideal straight line. This means that there is a certain liberty of choice when selecting a suitable standard cylinder for the compensator.

The present invention thus makes it possible, in an extremely simple, cost-effective and efficient manner, to equip or subsequently supplement cranes of the knuckle boom type so as to make them suited, in addition to their regular tasks, also to perform shrub cleaning The dimensioning and choice of a suitable standard cylinder can be made rapidly and routinely by means of a simple-program desk computer. If it is difficult to find a standard cylinder of suitable dimensions, there are vast possibilities of connecting different standard cylinders in series and/or in parallel. For instance, it is possible to connect two or more similar hydraulic cylinders in parallel or, alternatively, to connect two or more similar and/or different cylinders in series to obtain the desired proportions of the working areas in the compensator. It is also possible to connect hydraulic cylinders of different dimensions in parallel, but in such a case, their piston rods must be mechanically locked to each other in order to obtain a uniform movement. The modifications to be carried out in existing hydraulic systems are small. In principle, it suffices to connect a conduit containing an electrically operated hydraulic valve and a hydraulic cylinder between two existing conduits (conduits 9 and 15 in FIG. 2), a conduit 30 between two existing conduits (conduits 10 and 15 in FIG. 2), and an electrically operated hydraulic valve 29, cooperating with the valve 28, in the conduit 15.

POSSIBLE MODIFICATIONS OF THE INVENTION

The invention is of course not restricted only to the embodiment described above and illustrated in the drawings. Thus, for instance, it is also possible by means of a further compensator to adjust a telescoping movement of the outer boom to the raising and lowering of the outer boom and of the first boom section, respectively, so that also this telescoping movement will assist in maintaining the load application point on the desired level. This can be achieved in that the cylinder device controlling the telescoping movement, via a further compensator of the abovementioned type, can be connected to the lift cylinder and/or the outer boom cylinder, suitably in series. Further, the lowering side of the outer boom cylinder can be connected to the lifting side of the lift cylinder via a suitably oriented compensator instead of the manner illustrated in FIG. 2. It is of course also possible to control the movement of the load application point with the aid of the control means of the lift cylinder instead of the control means of the outer boom as described above, even though the latter alternative is preferred for practical reasons. Of course, it is possible to obtain a completely linear movement by exact dimensioning and, optionally, special manufacture of the compensator.

I claim:

1. A device for maintaining a tool attachment in a knuckle boom crane, as used in forest machines, at a constant level above the ground, in which the crane comprises a main boom which can be raised and lowered by means of a first double-acting hydraulic cylinder, and an outer boom pivotal relative to said main boom by means of a second double-acting hydraulic cylinder, characterized by at least one compensating hydraulic double-acting cylinder; connecting means connecting said compensating cylinder between said first and second hydraulic cylinders; and valve means for permitting hydraulic flow between said first and second hydraulic cylinders via said compensating hydraulic cylinder; said connecting means being such that an amount of hydraulic fluid which is proportional to the amount of fluid which upon activation of the outer boom is pressed out from the lifting or the lowering side, respectively, of one of said cylinders, is pressed into the lowering or the lifting side, respectively, of the other of said cylinders said compensating cylinder having two pressure chambers separated by a movable piston having two different working areas or displacements in said two chambers, and that the lift cylinder is connectible to one chamber and the outer boom cylinder is connectible to the other chamber, the working areas of said piston being so selected that the resulting hydraulic fluid flow between the lift cylinder and the outer boom cylinder positively ensures the desired vertical adjustment of the outermost point of the outer boom.

2. Device as claimed in claim 1, in which the outer boom can be extended by means of a double-acting hydraulic cylinder, characterized in that also said cylinder is connectible via a compensating cylinder to the lift cylinder the outer boom cylinder.

3. Device as claimed in claim 1, characterized by two or more compensating hydraulic cylinders connected in series after each other.

4. Device as claimed in claim 1, characterized by two or more compensating hydraulic cylinders connected in parallel with each other.

5. Device as claimed in claim 1, characterized by two or more compensating hydraulic cylinders at least one of which differs from the others, said cylinders being connected in parallel with each other and their piston rods being mechanically locked to each other.

6. Device as claimed in claim 1, in which the outer boom can be extended by means of a further double-acting hydraulic cylinder, characterized in that said further cylinder is connectible, via a compensating cylinder to the lift cylinder or the outer boom cylinder.

* * * * *